(12) United States Patent
Kanayama (10) Patent No.: US 7,860,385 B2
(45) Date of Patent: Dec. 28, 2010

(54) AUTOFOCUS SYSTEM

(75) Inventor: Atsushi Kanayama, Saitama (JP)

(73) Assignee: Fujinon Corporation, Saitama (JP)

( * ) Notice: Subject to any disclaimer, the term of this patent is extended or adjusted under 35 U.S.C. 154(b) by 143 days.

(21) Appl. No.: 12/370,935

(22) Filed: Feb. 13, 2009

(65) Prior Publication Data
US 2009/0238550 A1    Sep. 24, 2009

(30) Foreign Application Priority Data
Mar. 19, 2008  (JP) .......................... P2008-072240
Mar. 19, 2008  (JP) .......................... P2008-072242

(51) Int. Cl.
*G03B 13/36* (2006.01)
(52) U.S. Cl. ....................... 396/95; 396/121
(58) Field of Classification Search ............ 396/95, 396/121–123
See application file for complete search history.

(56) References Cited
U.S. PATENT DOCUMENTS
5,418,595 A * 5/1995 Iwasaki et al. ................ 396/95

2005/0007486 A1* 1/2005 Fujii et al. .................. 348/345
2006/0140612 A1* 6/2006 Yata ........................... 396/124
2007/0196091 A1* 8/2007 Yamaguchi .................. 396/95
2009/0237554 A1* 9/2009 Kanayama .................. 348/352
2009/0238549 A1* 9/2009 Kanayama .................... 396/95

FOREIGN PATENT DOCUMENTS
JP    2006-267221 A    10/2006

* cited by examiner

*Primary Examiner*—W. B. Perkey
(74) *Attorney, Agent, or Firm*—Birch, Stewart, Kolasch & Birch, LLP (57) ABSTRACT

When it is detected that a tracking target disappears in an image range in the course of tracking the tracking target, which is a registration pattern selected as a target to be tracked from among registration patterns, an autofocus is disabled. Thereafter, the autofocus is kept being disabled even if it is detected that the tracking target having the selected registration pattern appears in the image range. Alternatively, when the tracking target disappears in the image range in the course of tracking the tracking target, the autofocus is disabled, and thereafter when the tracking target having the registration pattern appears in the image range, it is started to track the tracking target having the registration pattern.

11 Claims, 8 Drawing Sheets

AUTOFOCUS SYSTEM

CROSS-REFERENCE TO RELATED APPLICATIONS

This application is based upon and claims the benefit of priority from the Japanese Patent Application Nos. 2008-72240 and 2008-72242 filed on Mar. 19, 2008; the entire contents of which are incorporated herein by reference.

BACKGROUND OF THE INVENTION

1. Technical Field

The invention relates to an autofocus system, and more particularly to an autofocus system capable of performing focus adjustment while tracking a desired subject (person) by automatically moving an autofocus (AF) target position (range) in a shooting range of a camera.

2. Description of the Related Art

There has been known an AF area auto-tracking system that is adapted to change autofocus (AF) area in accordance with movement of a subject in order to bring the subject into focus when a quickly moving subject in sporting scenes such as a soccer and a figure skating is shot by, for example, a TV camera and the like (for example, see JP 2006-267221 A (corresponding to US 2006/0140612 A).

In an imaging system (like a TV camera) that converts an image of a subject to an electric signal (image signal) by an imaging device (CCD or the like), a contrast mode is generally adopted as an autofocus (AF) mode. The contrast mode is to detect the contrast of a subject image from an image signal acquired by an imaging device, and control focus of a taking lens so that the highest contrast can be obtained, thereby automatically bring the subject into best focus.

In the AF in the contrast mode, the entire subject in the shooting range of a camera is not set to the target of the AF, but only a subject in a part of the shooting range is processed as the AF target in many cases. In the AF in the contrast mode, the image signals in the AF target range are extracted from the image signals acquired from the entire imaging area of the imaging device, and the target of the AF is limited only to the subject in a part of the range by controlling the focus so that the contrast of the extracted image signal in that range is maximized. In this specification, a subject range, being a target of the AF, in a shooting range of a camera or an image range of a target subject, being a target of the AF, in a shot image of a camera will be referred to as an "AF area", and a frame indicating an outline of the AF area will be referred to as an "AF frame".

In a lens system for broadcast, a cameraman performs a pan/tilt (P/T) operation and a zooming operation in order to capture a quickly moving subject like a figure skater. However, in such a situation, it is very difficult to move the AF area. In this case, the above-mentioned AF area auto-tracking system is useful.

SUMMARY OF THE INVENTION

In the above-mentioned AF area auto-tracking system, for example, it is possible to perform the tracking when a subject is moving at least within a shooting range. However, if a subject goes out of the shooting range and disappears from the screen (i.e. goes out of a frame), the tracking target is lost. Thus, if the subject comes into the shooting range again (i.e., comes into the frame), the subject may not be recognized by a simple pattern recognizing and the subject may not be tracked.

Also, for example, in the case where a soccer game is shot, for example, in the case where a large number of subjects move similarly in a shooting range, it is difficult to continuously track a specific subject that is previously recognized by means of a simple pattern recognition technique, and the tracking target would be changed. As a result, there is a possibility that an image of the subject to be tracked originally might be blurred.

Furthermore, in a face recognition technique provided to recent digital cameras, it is effective to simply extract a person in a shooting range. However, in the case where not only a specific person but also a plurality of persons exist in a frame, it is difficult to recognize the specific person just by setting an AF frame onto a face. Thus, there is a possibility that the target of the AF may be changed to another person.

The invention has been made in view of the above situation so as to solve the problems and provides an autofocus system that can automatically track a desired AF target and perform an AF control when a person who is an AF target disappears from a shooting range or appears in the shooting range.

[1] According to an aspect of the invention, an autofocus system includes an imaging unit, an autofocus unit, a tracking unit, a pattern registration unit, a tracking target detection unit and a tracking target selection unit. The imaging unit takes a subject image formed by an optical system. The autofocus unit performs autofocus adjustment that adjusts focus of the optical system so as to bring into focus a subject in an AF area in a shot image taken by the imaging unit. The tracking unit moves the AF area in accordance with movement of a tracking target subject in the image taken by the imaging unit. The pattern registration unit registers a registration pattern of at least one subject among subjects in the image taken by the imaging unit. The tracking target detection unit detects the at least one registration pattern, which is registered in the pattern registration unit, from among subjects in the image taken by the imaging unit. The tracking target selection unit selects a registration pattern to be tracked, from among the at least one registration pattern registered in the pattern registration unit. When the tracking target detection unit detects that the tracking target subject disappears from the image in the course of tracking the tracking target subject having the registration pattern selected by the tracking target selection unit, the autofocus adjustment of the autofocus unit is disabled, and thereafter a disable state of the autofocus adjustment is maintained even if the tracking target detection unit detects that a subject having any of the at least one registration pattern registered in the pattern registration unit appears in the image.

With this configuration, when a person (tracking target) who is an AF target disappears from or appears in the shooting range, it is possible to automatically tracking a desired AF target and perform the AF control in response thereto.

[2] According to another aspect of the invention, an autofocus system includes an imaging unit, an autofocus unit, a tracking unit, a pattern registration unit, a tracking target detection unit and a tracking target selection unit. The imaging unit takes a subject image formed by an optical system. The autofocus unit performs autofocus adjustment that adjusts focus of the optical system so as to bring into focus a subject in an AF area in a shot image taken by the imaging unit. The tracking unit moves the AF area in accordance with movement of a tracking target subject in the image taken by the imaging unit. The pattern registration unit registers a registration pattern of at least one subject among subjects in the image taken by the imaging unit. The tracking target detection unit detects the at least one registration pattern, which is registered in the pattern registration unit, from among subjects in the image taken by the imaging unit. The tracking target selection unit selects a registration pattern from among the at least one registration pattern registered in the pattern registration unit. When the tracking target detection unit detects that the tracking target subject disappears from the image in the course of tracking the tracking target subject having the registration pattern selected by the tracking target selection unit, the autofocus adjustment of the autofocus unit is disabled, and thereafter when the tracking target detection unit detects that a subject having any of the at least one registration pattern registered in the pattern registration unit appears in the image, the tracking unit starts to track the subject having the detected registration pattern.

With this configuration, when a person (tracking target) who is an AF target disappears from or appears in a shooting range, it is possible to automatically tracking a desired AF target and perform the AF control in response thereto.

[3] Also, in the autofocus system [2], when the tracking unit starts to track the subject having the detected registration pattern, a priority may be given to the subject having the selected registration pattern as the tracking target subject.

With this configuration, it is possible to continuously track a desired tracking target.

[4] According to further another aspect of the invention, an autofocus system includes an imaging unit, an autofocus unit, a tracking unit, a pattern registration unit, a tracking target detection unit, a tracking target selection unit and a tracking mode switch unit. The imaging unit takes a subject image formed by an optical system. The autofocus unit performs autofocus adjustment that adjusts focus of the optical system so as to bring into focus a subject in an AF area in a shot image taken by the imaging unit. The tracking unit moves the AF area in accordance with movement of a tracking target subject in the image taken by the imaging unit. The pattern registration unit registers a registration pattern of at least one subject among subjects in the image taken by the imaging unit. The tracking target detection unit detects the at least one registration pattern, which is registered in the pattern registration unit, from among subjects in the image taken by the imaging unit. The tracking target selection unit selects a registration pattern from among the at least one registration pattern registered in the pattern registration unit. The tracking mode switch unit switches between two tracking modes. The two tracking modes include first and second tracking modes. In the first tracking mode, when the tracking target detection unit detects that the tracking target subject disappears from the image in the course of tracking the tracking target subject having the registration pattern selected by the tracking target selection unit, the autofocus adjustment of the autofocus unit is disabled, and thereafter a disable state of the autofocus adjustment is maintained even if the tracking target detection unit detects that a subject having any of the at least one registration pattern registered in the pattern registration unit appears in the image. In the second tracking mode, when the tracking target detection unit detects that the tracking target subject disappears from the image in the course of tracking the tracking target subject having the registration pattern selected by the tracking target selection unit, the autofocus adjustment of the autofocus unit is disabled, and thereafter when the tracking target detection unit detects that a subject having any of the at least one registration pattern registered in the pattern registration unit appears in the image, the tracking unit starts to track the subject having the detected registration pattern.

With this configuration, when a person (tracking target) who is an AF target disappears from or appears in a shooting range, it is possible to perform an optimal tracking control in accordance with a situation.

As described above, with the configurations of [1] to [4], when the person (tracking target), who is the AF target, disappears from or appears in the shooting range, it is possible to automatically track a desired AF target and perform the AF control in response thereto.

[5] According to still another aspect of the invention, an autofocus system includes an imaging unit, an autofocus unit, a tracking unit, a pattern registration unit, a tracking target detection unit, a tracking target selection unit and a tracking mode switch unit. The imaging unit takes a subject image formed by an optical system. The autofocus unit performs autofocus adjustment that adjusts focus of the optical system so as to bring into focus a subject in an AF area in a shot image taken by the imaging unit. The tracking unit moves the AF area in accordance with movement of a tracking target subject in the image taken by the imaging unit. The pattern registration unit registers a registration pattern of at least one subject among subjects in the image taken by the imaging unit. The tracking target detection unit detects the at least one registration pattern, which is registered in the pattern registration unit, from among subjects in the image taken by the imaging unit. The tracking target selection unit selects a registration pattern from among the at least one registration pattern registered in the pattern registration unit. The tracking mode switch unit switches between first and second modes. In the first tracking mode, when the tracking target detection unit detects that the tracking target subject disappears from the image in the course of tracking the tracking target subject having the registration pattern selected by the tracking target selection unit, the autofocus adjustment of the autofocus unit is disabled. In the second tracking mode, when the tracking target detection unit detects that the tracking target subject disappears from the image in the course of tracking the tracking target subject having the registration pattern selected by the tracking target selection unit, if a subject having another registration pattern, which is registered in the pattern registration unit and other than the selected registration pattern, exists in the image, the tracking unit tracks the subject having said another registration pattern.

With this configuration, it is possible to perform an autotracking control appropriate to a scene.

[6] In the autofocus system of [5], in the first tracking mode, when a subject having any of the at least one registration pattern registered in the pattern registration unit appears in the image with the autofocus adjustment disabled, the autofocus adjustment may be kept being disabled.

[7] In the autofocus system of [5], in the first tracking mode, when a subject having any of the at least one registration pattern registered in the pattern registration unit appears in the image with the autofocus adjustment disabled, the tracking unit may start to track the subject having appeared in the image.

[8] In the autofocus system of [5] according to claim 5, in the first tracking mode, the tracking mode switch unit may further switch between third and fourth tracking modes. In the third tracking mode, when a subject having any of the at least one registration pattern registered in the pattern registration unit appears in the image with the autofocus adjustment disabled, the autofocus adjustment is kept being disabled. In the fourth tracking mode, when a subject having any of the at least one registration pattern registered in the pattern registration unit appears in the image with the autofocus adjustment disabled, the tracking unit starts to track the subject having appeared in the image.

With the configurations of [6] to [8], it is possible to perform more precise tracking control in accordance with a shooting situation.

[9] In the autofocus system of any one of [5] to [8], in the second tracking mode, when the tracking target subject appears in the image again in the course of tracking the subject having said another registration pattern, the tracking unit may continue to track the subject having said another registration pattern.

[10] In the autofocus system of any one of [5] to [8], in the second tracking mode, when the tracking target subject appears in the image again in the course of tracking the subject having said another registration pattern, the tracking unit may stop tracking the subject having said another registration pattern, and start tracking the tracking target subject again.

[11] In the autofocus system of any one of [5] to [8], in the second tracking mode, the tracking mode switch unit may further switch between fifth and sixth tracking modes. In the fifth tracking mode, when the tracking target subject appears in the image again in the course of tracking the subject having said another registration pattern, the tracking unit may continue to track the subject having said another registration pattern. In the sixth tracking mode, when the tracking target subject appears in the image again in the course of tracking the subject having said another registration pattern, the tracking unit may stop tracking the subject having said another registration pattern and start tracking the tracking target subject again.

With the configurations of [9] to [11], it is possible to perform more precise tracking control in accordance with a shooting situation.

As described above, with the configurations of [5] to [11], when a person who is an AF target disappears from or appears in a shooting range, it is possible to automatically track a desired AF target and perform an AF control in response thereto. Thus, it is possible to perform an auto-tracking control appropriate to a scene.

DETAILED DESCRIPTION OF EMBODIMENTS OF THE INVENTION

Hereinafter, with referring to the accompanying drawings, an autofocus system according to embodiments of the invention will be described in detail.

Figure 1:
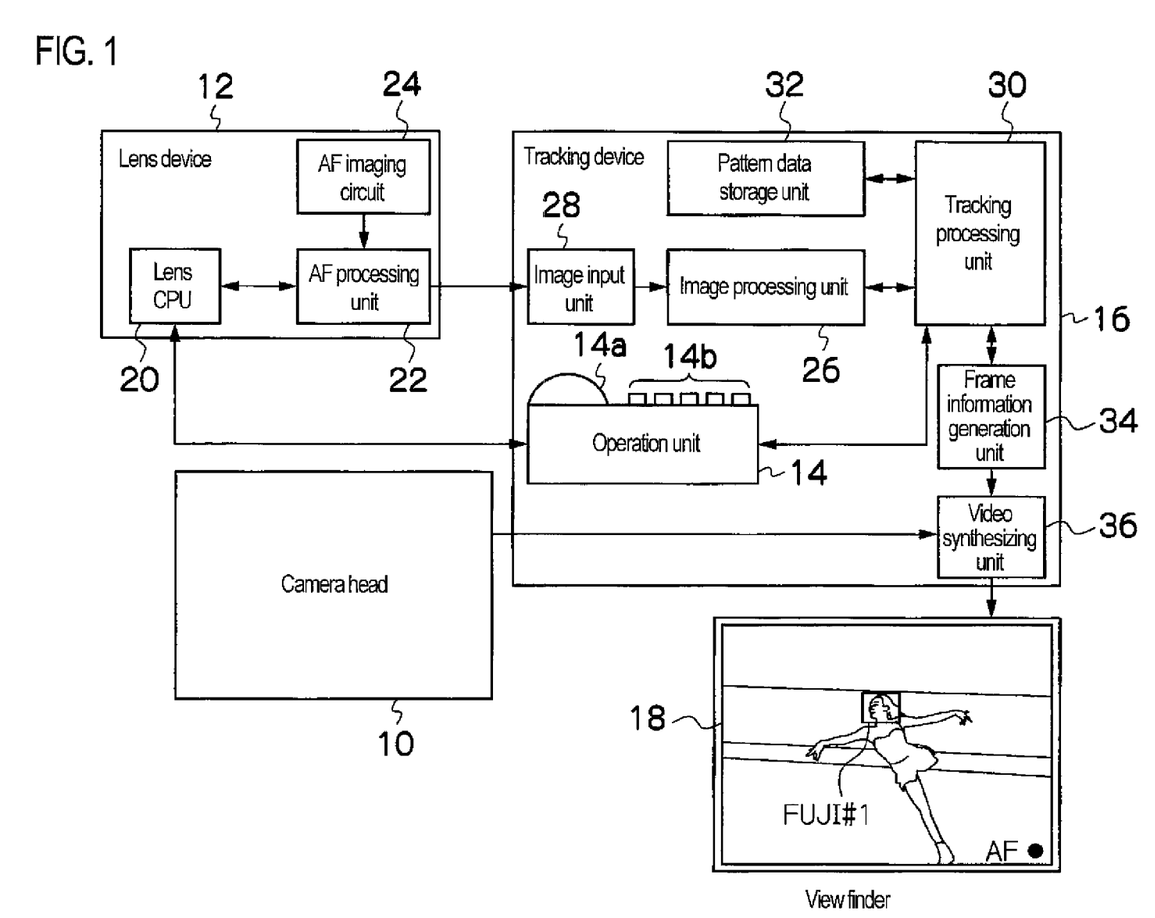
FIG. 1 is a block diagram showing the overall configuration of an imaging system to which an autofocus system according to an embodiment of the invention is applied.

FIG. 1 is a block diagram showing the overall configuration of the imaging system to which the autofocus system according to an embodiment of the invention is applied. The imaging system shown in the drawing is, for example, an imaging system that is used to shoot an image by a TV camera for broadcast. FIG. 1 shows a camera head 10 whose lens can be replaced, a lens device 12 that has a taking lens (optical system) attached to a lens mount of the camera head 10, a tracking device 16 that includes an operation unit 14, and the like.

The camera head 10 is mounted with an imaging device (for example, a CCD), a signal processing circuit, and the like. An image formed by the taking lens of the lens device 12 is photoelectrically converted by the imaging device, and then signal processing is performed for the image by the signal processing circuit. A video signal of a certain format is generated by the signal processing circuit, and is output from a video signal output terminal or the like of the camera head 10 to an external equipment. Furthermore, a viewfinder (monitor) 18 is adapted to display a video taken by the camera head 10 and be used to check composition thereof, and is installed in the tracking device 16. The video signal from the camera head 10 is sent to the viewfinder 18, and a real-time image (video) currently being taken by the camera head 10 is displayed on the screen of the viewfinder 18. Furthermore it is possible to display on the screen of the viewfinder 18 information such as an AF frame indicating an AF area range that is a autofocus (AF) target.

The lens device 12 is provided with the taking lens (optical system), which is not shown in the drawings and is attached to the lens mount of the camera head 10. The taking lens forms an image of a subject on an imaging surface of the imaging device of the camera head 10. The taking lens includes, as its elements, movable portions for adjusting a shooting condition. The movable portions such as a focus lens group, a zoom lens group, and an aperture diaphragm are electrically driven by a motor (servomechanism) not shown in the drawings. For example, the focus lens group and the zoom lens group move in an optical axis direction, the movement of the focus lens group adjusts a focus (subject distance), and the movement of the zoom lens group adjusts a focal length (zoom power). Like this exemplary embodiment, in a system that relates to control of autofocus, at least the focus lens group may be electrically driven, and the other movable portions may be only driven manually. When a certain movable portion is electrically driven by an operator's operation, the certain movable portion is controlled based on control signals output from an operation unit (an operation unit of a controller connected to the lens device 12 or the like), which is not shown in the drawings, in accordance with the operator's operation, but details thereon are omitted here.

As shown in the drawing, the lens device 12 is mounted with a lens CPU 20 for integrally controlling the entire lens device 12, an AF processing unit 22 that executes autofocus (AF) processing, an AF imaging circuit 24, and the like. The AF imaging circuit 24 is disposed on the lens device 12 in order to acquire a video signal for AF process. The AF imaging circuit 24 includes the imaging device (CCD or the like) and the processing circuit for outputting an output signal of the imaging device as the video signal in the certain format, and the like. The imaging device of the AF imaging circuit 24 may be referred to as an "AF imaging device". It is assumed that the video signal output from the AF imaging circuit 24 is a luminance signal. Light is branched from subject light incident on the imaging device of the camera head 10 by the use of a half mirror or the like disposed on a light path of the taking lens, and the branched light forms an image on the imaging surface of the AF imaging device. A shooting range and a subject distance (a distance at which a subject can be focused to) for an imaging area of the AF imaging device are configured to match a shooting range and a subject distance for an imaging area of the imaging device of the camera head 10. A subject image acquired by the AF imaging device matches a subject image acquired by the imaging device of the camera head 10. It is not necessary for the both shooting ranges to be completely matching. For example, the shooting range of the AF imaging device may be large enough to contain include the shooting range of the imaging device of the camera head 10.

The AF processing unit 22 acquires the video signal from the AF imaging circuit 24, and calculates a focus evaluation value indicating a level of a contrast of the subject image based on the video signal. For example, high-frequency component signals of the video signal acquired from the AF imaging device are extracted by a high-pass filter, and then of the high-frequency component signals, signals in a range corresponding to an AF area that is an AF target are integrated for each screen (frame). An integrated value thus acquired for each screen indicates the level of the contrast of the subject image, and is given to the lens CPU 20 as the focus evaluation value. Furthermore, the range of the AF area is designated by the lens CPU 20 as will be described later.

As will be described in detail later, the lens CPU 20 acquires information (AF frame information) of the AF frame indicating a range (outline) of the AF area from an operation unit 14, and informs of the AF processing circuit 22 a range in the AF frame that is designated by the AF range information as the AF area. Then, the focus evaluation value, which is obtained from the image (video signal) in the AF area, is acquired from the AF processing unit 22. In this manner, whenever a video signal for each screen is acquired from the AF imaging circuit 24 (whenever a focus evaluation value is acquired from the AF processing unit 22), the lens CPU 20 acquires the focus evaluation value from the AF processing unit 22, and controls the focus lens group so as to maximize the acquired focus evaluation value (to take a local maximum value), that is, maximize the contrast of the subject image in the AF area. For example, a climbing mode is generally known as a mode of controlling the focus lens group based on the focus evaluation value. In this mode, the focus lens group is moved in a direction for increasing the focus evaluation value, and then if a point at which the focus evaluation value starts to decrease is detected, the focus lens group is set to the detected point. Thus, it is possible to automatically bring the subject in the AF frame into focus.

The tracking device 16 is a device for moving an AF point in accordance with a movement of a target object specified by an operator while tracking on the screen the target object, and for automatically changing a position of the AF frame. The tracking device 16 includes the operation unit 14, an image processing unit 26, an image input unit 28, a tracking processing unit 30, a pattern data storage unit 32, a frame information generation unit 34, a video synthesizing unit 36, and the like.

If the operator does not perform an operation for changing the AF frame, the tracking device 16 automatically changes the AF frame. In contrast, if the operator performs the operation for changing the AF frame, the operation is prioritized over the tracking device 16, and thus the AF frame is changed in accordance with the operator's operation.

The operation unit 14 includes a track ball 14a for specifying a moving direction of the AF frame and a moving amount of the AF frame as an operation member that allows the operator to specify settings of the AF frame such as a position, a shape, and a size of the AF frame. Further, the operation unit 14 includes a press-button type switch 14b as an operation member for registering or selecting which subject in the screen is set as a tracking target to be tracked by performing the AF. As shown in FIG. 1, a plurality of the switches 14b may be provided. Tracking targets may be registered in association with the switches 14b, respectively, and thereby the plural tracking targets to be tracked by performing the AF may be registered. Pattern data (registration pattern) of the registered tracking target is stored in a database of the pattern data storage unit 32 (which will described later).

Figure 2:
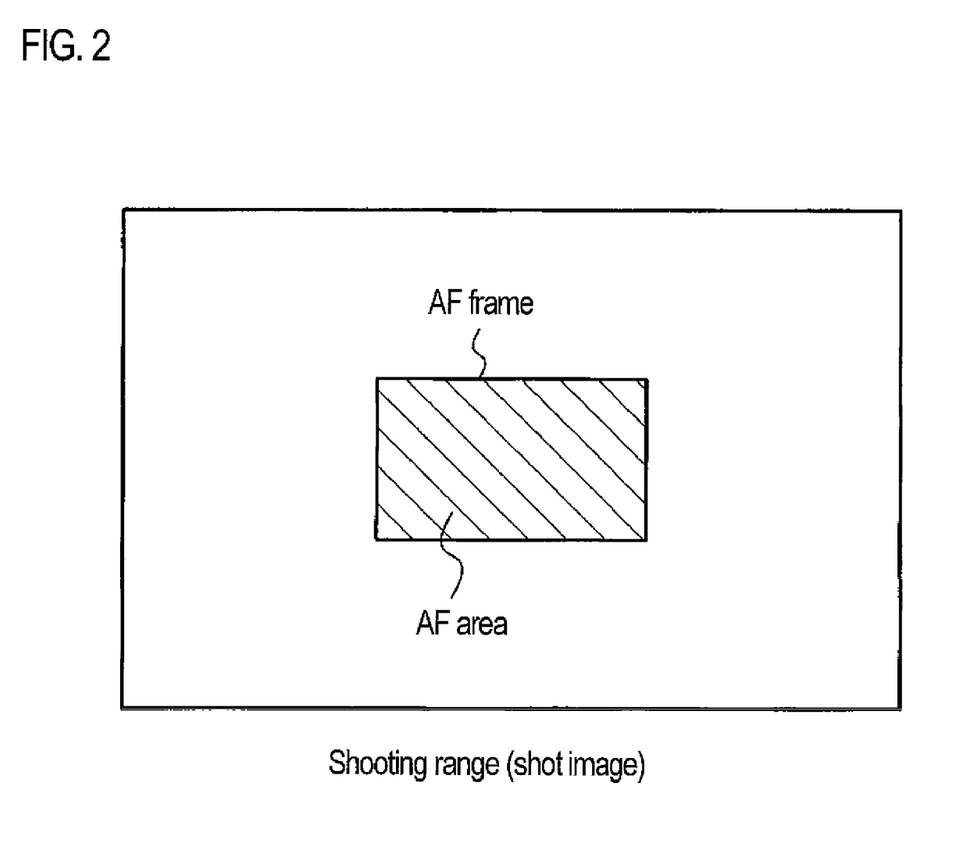
FIG. 2 is an explanatory diagram showing an example of an AF frame.

FIG. 2 shows an example of the AF frame. As shown in FIG. 2, the AF frame indicates the outline of the AF area indicating an AF target range in a shot image or in a shooting range of the imaging device of the camera head 10.

If the operator operates the operation member, the operation unit 14 sets and changes the settings such as a position of the AF frame in accordance with the operation. In this embodiment, it is assumed that the shape of the AF frame is limited to a rectangle. Changing of the settings of the AF frame such as the position of the AF frame and the shape of the AF frame by the operation member of the operation unit 14 is performed by changing the settings of the AF frame by a change amount corresponding to an operation amount of the operation member with reference to the settings of the AF frame before the operator's operation. For example, a position of the AF frame is moved vertically and horizontally in a direction corresponding to a rotation direction of the trackball 14a and by a movement amount corresponding to a rotation amount of the trackball 14a. If an AF point is defined as a point for determining the position of the AF frame (center position of the rectangular AF frame in this embodiment) in the shooting range (shot image), the position of the AF frame is determined by setting the position of the AF point.

On the other hand, during a period in which the operation member is not operated and the operator does not give an instruction of changing the settings of the AF frame, the AF frame is set and/or changed in the tracking processing unit 30 (which will be described later). The operation unit 14 transmits to the lens CPU 20 and the tracking processing unit 30 the AF frame information indicating the settings of the AF frame, which are set and changed by the operator's operation, in accordance with a request from the lens CPU 20. The AF frame information indicating the settings of the AF frame, which are set and changed in tracking processing unit 30, is transmitted to the lens CPU 20 through the operation unit 14. Thereby, an AF target range in which the tracking processing unit 30 performs the tracking process is set to the range of the AF frame.

The image input unit 28 obtains the video signal (luminance signal) acquired by the AF imaging circuit 24 through the AF processing unit 22, and provides the image processing unit 26 with an image (image data) that is in a range specified by the image processing unit 26 and is in the shooting range.

The image processing unit 26 performs predetermined image processing for the image data acquired from the image input unit 28, and sends the processed image data to the tracking processing unit 30.

In the AF area, which is determined from the sent image data based on the set AF frame, the tracking processing unit 30 identifies and recognizes a person's face (object) based on a well-known face (object) authentication technique for security by using the pattern data (registration pattern) stored in the pattern data storage unit 32. Then, the tracking process unit 30 tracks a specific person (object) who is the tracking target in the AF area and performs the AF for the specific person (object), and moves the AF point so as to follow a movement of the target object.

The pattern data storage unit 32 registers and stores the pattern data that is required to recognize the specific person (object) in the AF area as a tracking target to be tracked by performing the AF. At this time, if one pattern data (registration pattern) is registered so as to correspond to each of the plurality of switches 14b, it is possible to register plural pieces of (plural persons') pattern data (registration pattern) of the tracking targets.

As for the registration of the pattern data, the operator may register the pattern data in advance while associating the pattern data with each switch 14b. Alternatively, during shooting, the tracking processing unit 30 may automatically assign pattern data of persons in the screen to the switches 14b for registration. In the example shown in FIG. 1, since the number of switches 14b is five, it is possible to resister five persons at maximum. However, the number of the registerable persons is not particularly limited.

If the operator presses one of the switches 14b when the pattern data indicating the tracking target is registered in the pattern data storage unit 32, the tracking target of the pattern data corresponding to the pressed switches 14b is selected. When the tracking target is selected, whether or not the selected tracking target exists in the screen is searched all the time during shooting. When the selected tracking target is detected, the tracking target subject is tracked and simultaneously the AF is started. The operation unit 14 is further provided with an auto-tracking switch (not shown in the drawing) for giving instructions of starting and ending the auto-tracking.

Furthermore, there is a case that the plurality of tracking targets are registered in the pattern data storage unit 32. In this case, in order to make it possible to automatically select which registration pattern is to be tracked when a plurality of registration patterns exist in the screen or when a registration pattern disappears from or appears in the screen, priorities may be assigned to the plural registration patterns, respectively. An order in which the tracking targets are registered in association with the switches 14b (numbers of switches) may be used as priorities as they are.

The frame information generation unit 34 receives the AF frame information from the tracking processing unit 30, and generates AF frame display data for superimposing and displaying the AF frame on an image displayed on the display screen of the viewfinder 18.

The video synthesizing unit 36 synthesizes the image data (video signal) received from the camera head 10 and frame information data that is generated for display and is received from the frame information generation unit 34, generates a synthesized video for display on the viewfinder 18, and sends the synthesized video to the viewfinder 18.

In the viewfinder 18, the image is displayed with the AF frame being superimposed and display in a corresponding position on the screen. Furthermore, a frame may be displayed on a face of the person of the registration pattern, which is the tracking target in the AF frame. The switches 14b may also serve as a switch for turning ON/OFF display of the face frame. Furthermore, as shown in FIG. 1, for example, a title such as "FUJI#1" for specifying a tracking target may be display for the face frame, and an indication that the AF is running or the like may be displayed on a lower side of the screen.

Next, a basic operation of the autofocus system of this embodiment will be described.

Figure 3A:
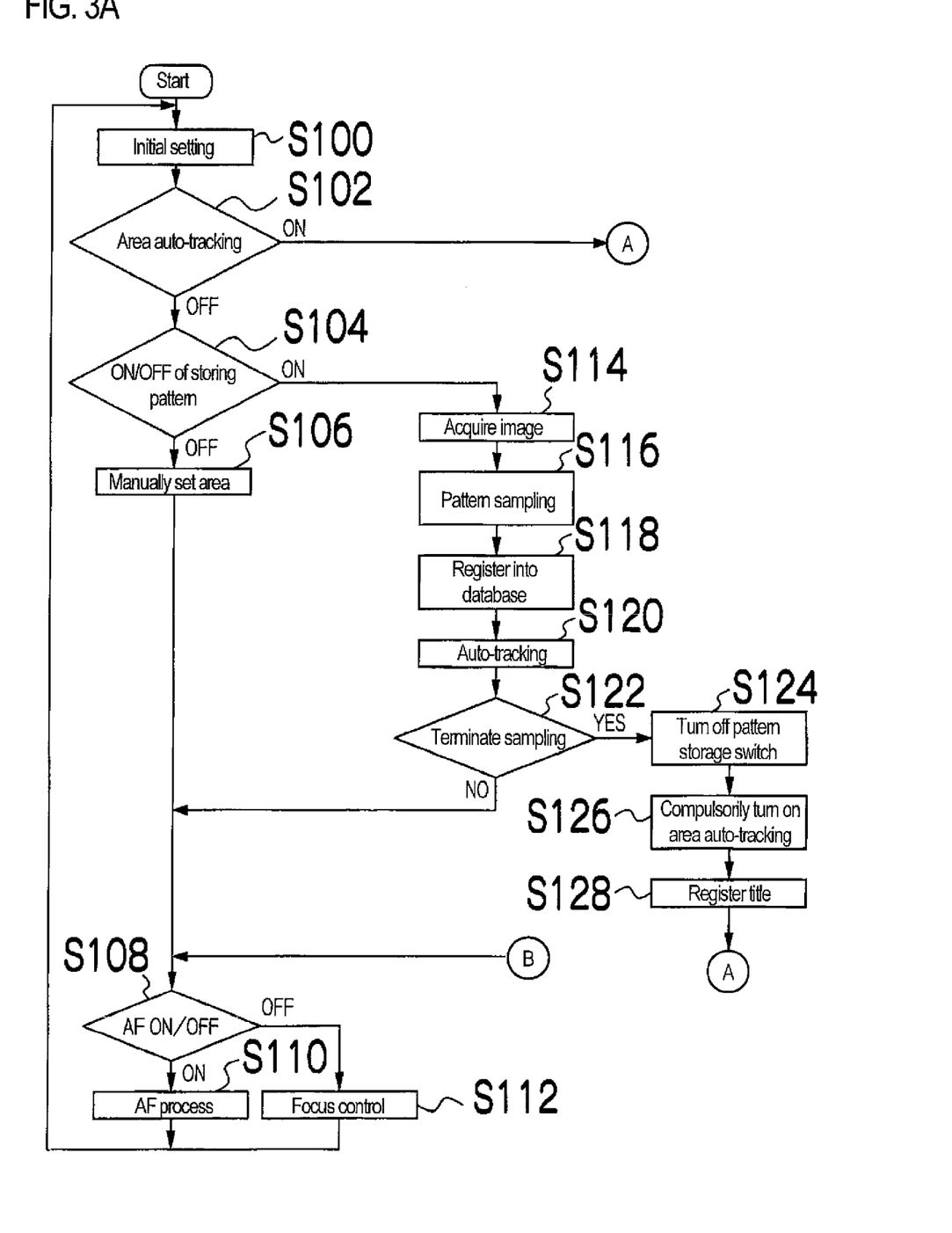
FIGS. 3A and 3B are a flowchart showing a basic operation of the autofocus system of one embodiment.
Figure 3B:
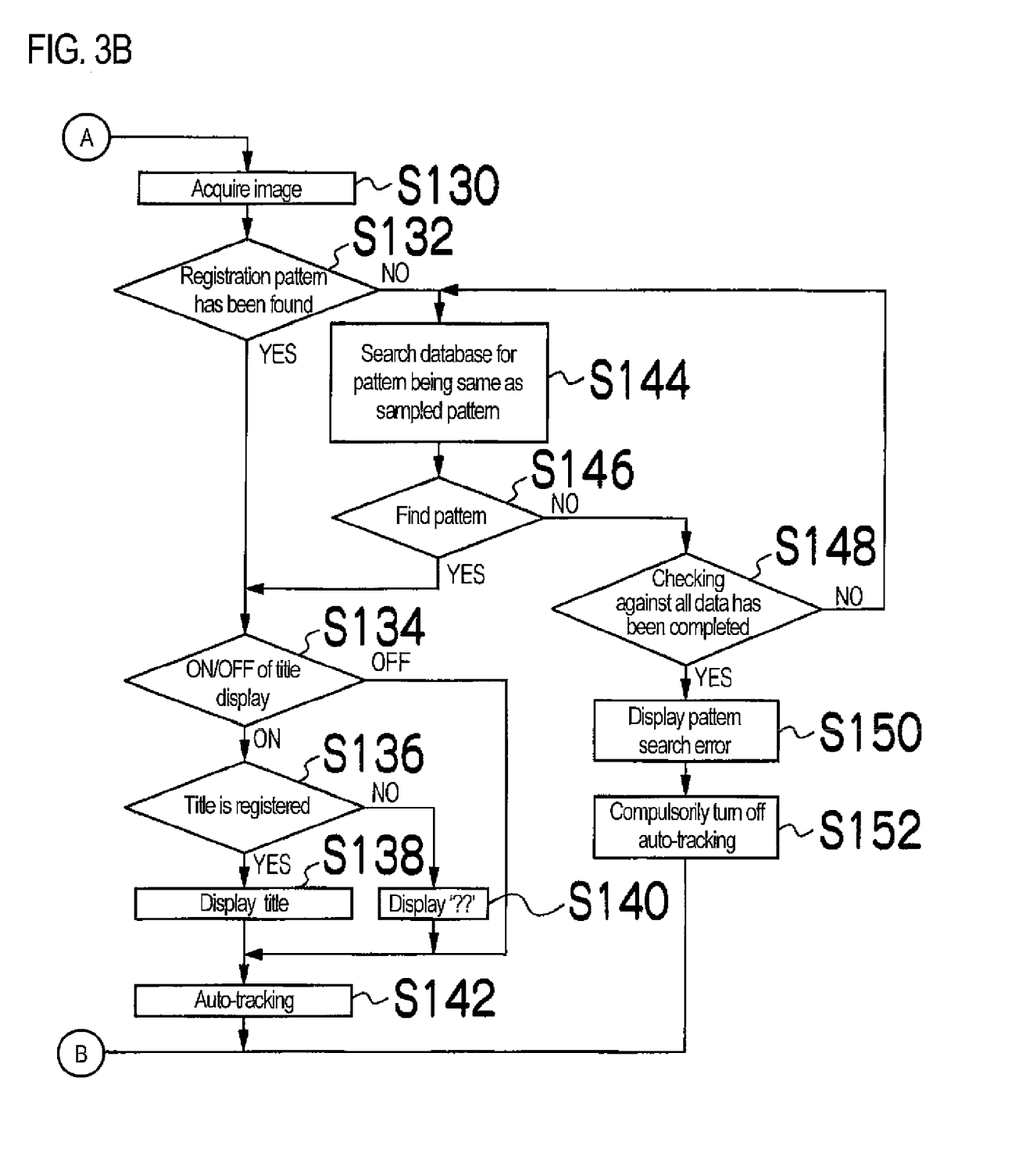

FIGS. 3A and 3B are a flowchart showing a basic operation of the autofocus system of the embodiment.

In the embodiment shown in FIGS. 3A and 3B, one person subject (one object) is set as the tracking target, a registration pattern of the tracking target is detected from a shot image and is automatically tracked.

First, an initial setting is performed in step S100 of FIG. 3A.

Next, in step S102, it is determined as to whether or not the auto-tracking is performed. This determination is made based on ON/OFF state of the tracking switch for giving instructions of starting and ending that the AF area automatically tracks a target. The tracking switch is not shown in the drawing, but for example, is installed in the operation unit 14.

If it is determined in step S102 that the auto-tracking is OFF, it is determined in in the following step S104 as to whether or not the tracking target is to be registered and its pattern data (registration pattern) is to be stored. This determination is made based on ON/OFF state of the switches 14b mentioned above.

If the determination in step S104 results in that the tracking target is not to be registered and its registration pattern is not to be stored, the operator manually sets the AF area in the following step S106.

When the AF area is set manually, it is determined in the following step S108 as to whether the AF (autofocus). This determination is based on ON/OFF state of the AF switch, which is also not shown in the drawing and is adapted to give instructions of starting and ending the AF.

If the AF is ON, the normal AF process is performed in the following step S110, and the focus lens is automatically controlled to be focused on the subject in the set AF area.

On the other hand, if it is determined in step S108 that the AF is OFF, the operator manually performs a focus control in step S112.

Furthermore, if the determination made in step S104 results in that the tracking target is to be registered and its registration pattern is to be stored, the registration pattern of the tracking target is registered and stored by the following procedure. Specifically, at first, in step S114, the image processing unit 26 of the tracking device 16 acquires an image through the image input unit 28.

Next, a pattern sampling is performed from the image, which is acquired by the image processing unit 26 in step S116. A face of the subject person is detected in the image, and pattern data is extracted, which is required to recognize a specific person as a tracking target.

In step S118, the above extracted pattern data is registered (stored) in the database of the pattern data storage unit 32 through the tracking processing unit 30.

In step S120, the tracking processing unit 30 tracks the tracking target indicated by the registration pattern just registered and starts the AF. The operator checks the tracking target by using the viewfinder 18.

In step S122, the operator determines as to whether or not the sampling is terminated, based on whether or not the current auto-tracking target is appropriate.

If it is determined in step S122 that the sampling is terminated, the switches 14b for giving an instruction of registering (storing) the registration pattern is turned OFF in step S124.

As described above, when the registration (storage) of the registration pattern is terminated, the tracking processing unit 30 starts the auto-tracking process by turning ON an internal switch for compulsorily starting to track the just registered tracking target as the target of the AF area in the following step S126

Subsequently, a title (name, number, or the like) for the tracking target is registered in step S128. When the title of the tracking target is registered, the title (name, number, and the like), which indicates the tracking target, like "FUJI#1" is displayed on the display screen of the viewfinder 18 as shown in FIG. 1. The registration of the title is performed, for example, by using an alphanumeric keyboard that is not shown in the drawing and is provided in the operation unit 14. After the registration of the title, the flow advances to step S130, and the auto-tracking process is performed.

Meanwhile, if it is determined in step S122 that the sampling is not yet to be terminated because the sampling is required to be performed again, for example, because the pattern, which is sampled and registered in the database, is different from a target that the operator intends to track, the flow advances to step S108, and returns to step S102.

Furthermore, if it is determined in step S102 that the auto-tracking is ON, the flow advances to step S130, and the following auto-tracking process is performed.

First, the image processing unit 26 acquires an image currently being shot in the AF area from the lens device 12 through the image input unit 28 in step S130. The image processing unit 26 detects a face from the acquired image, and acquires data required for comparison to the registration pattern.

Although the AF area auto-tracking is now being performed, it is determined as to whether or not a subject in the AF area of the shot image has already been found as a registration pattern in step S132.

If the determination result shows that the subject has already been found as the registration pattern and a tracking target corresponding to the pattern is automatically tracked, the flow advances to step S134. Then, it is further determined as to whether or not a title of the tracking target is displayed. Whether or not the title is displayed is determined based on whether the switch 14b corresponding to the registration pattern is in a display ON state or a display OFF state, or the like. Furthermore, in this embodiment, the switch 14b serves as a switch for giving instructions of the pattern registration and a switch for giving instructions of the title display. However, those switches are formed as individual switches.

If the title display is ON in step S134, it is determined in the following step S136 as to whether or not the title for the tracking target is registered.

If the title is registered, the title of the registered tacking target is displayed as, for example, "FUJI#1" in step S138. If the title is not registered, for example, "#??" is displayed in step S140. Thereby, the operator easily checks as to whether or not the subject(s) being displayed on the screen of the viewfinder 18 are registered.

Then, the auto-tracking is continuously preformed for the tracking target in step S142.

Furthermore, if the registration pattern, which is the tracking target, has not yet been found in step S132, the tracking processing unit 30 searches the image of the AF area received from the image processing unit 26 for a pattern that is the same as any of the registration pattern(s), which are sampled and registered in the database of the pattern data storage unit 32, in step S144.

If the pattern, which is the same as any of the registration pattern(s) are found in step S146, the flow advances to step S134, and the process for the case where the above-mentioned registration pattern has already found is performed. Furthermore, if the pattern being the same as the registration pattern is not found, it is determined in step S148 as to whether or not checking the sampled pattern against all the registration pattern data has been completed. Further, if the checking against all the data has not been completed, the flow returns to step S144. In contrast, if the checking against all the data has been completed, a pattern search error is displayed in step S150. Subsequently, the auto-tracking for the target of the AF area is compulsorily turned OFF in step S152, and the flow advances to step S108.

Next, another exemplary configuration of an imaging system to which the autofocus system according to an embodiment of the invention is applied will be described.

Figure 4:
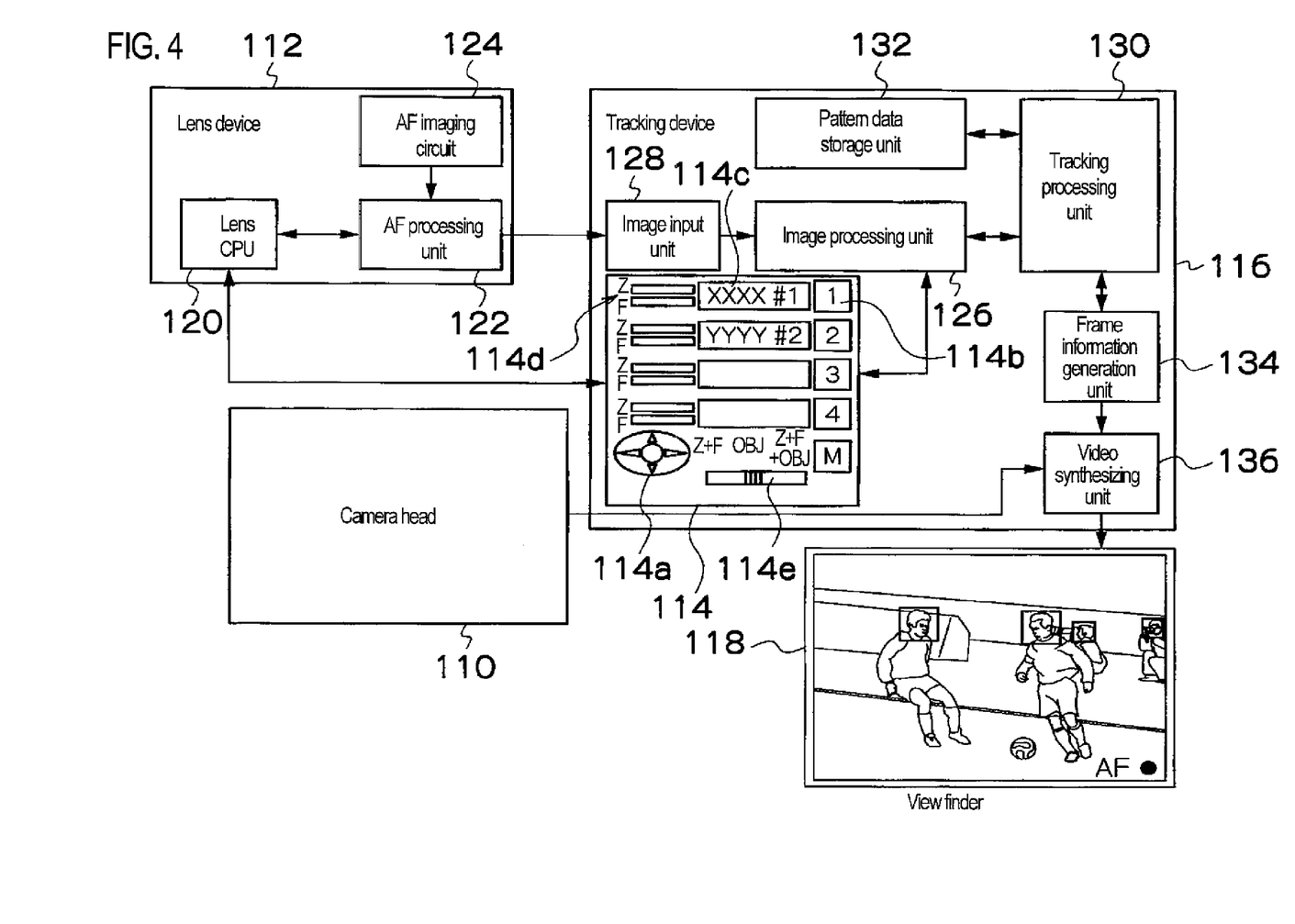
FIG. 4 is a block diagram showing another exemplary configuration of an imaging system to which the autofocus system according to an embodiment of the invention is applied.

FIG. 4 is a block diagram showing another exemplary configuration of the imaging system to which the autofocus system according to this embodiment of the invention is applied.

The imaging system shown in FIG. 4 has substantially the same configuration as the imaging system shown in FIG. 1. The imaging system includes a camera head 110, a lens device 112, a tracking device 116 including an operation unit 114, a viewfinder 118 and the like.

The camera head 110 is mounted with an imaging device (for example, a CCD), a required signal processing circuit, and the like. The lens device 112 is provided with a taking lens not shown in the drawings, and the taking lens is attached to a lens mount of the camera head 110. An image of a subject is formed by the taking lens on an imaging surface of the imaging device of the camera head 110. Furthermore, the lens device 112 is mounted with a lens CPU 120, an AF processing unit 122, an AF imaging circuit 124, and the like.

The tracking device 116 includes the operation unit 114, an image processing unit 126, an image input unit 128, a tracking processing unit 130, a pattern data storage unit 132, a frame information generation unit 134, a video synthesizing unit 136, and the like.

Furthermore, the example shown in FIG. 4 is different only in only the configuration of the operation unit 114 from that shown in FIG. 1. The configuration of this example is the same as that of FIG. 1 mentioned above except the operation unit 114. Accordingly, detailed description of the configuration of each part except the operation unit 114 will be omitted.

The operation unit 114 in FIG. 4 includes: an arrow key 114a as an operation member for manually specifying a moving direction of the AF frame and a moving amount of the AF frame, instead of the track ball 14a; switches 114b for registering and selecting a tracking target; a display panel 114c for checking registration of a title of the tracking target; an indicator 114d indicating states of zooming (Z) and focusing (F); a slide switch 114e for selecting a tracking mode (which will be described later).

The switches 114b are used to register or select a tracking target(s) similarly to the switches 14b of the operation unit 14 in FIG. 1. Tracking targets can be registered in association with the respective switches 114b. Also, titles for identifying the tracking targets can be registered for the respective tracking targets. The registration of the title is performed by inputting alphanumeric characters by a keyboard not shown in the drawings. On the display panel 114c for checking, the input title is displayed.

In the example shown in FIG. 4, a tracking target having a title of "XXXX#1" is registered in No. 1 of the switches 114b, and a tracking target having a title of "YYYY#2" is registered in No. 2 of the switches 114b.

In the indicator 114d, one group of Z (zooming) and F (focusing) is provided for each switch 114b, and each group is adapted to display the zooming and focusing conditions.

The slide switch 114e (an example of a tracking mode switch unit) is adapted to switch between tracking modes. The tracking modes will be described later in detail. In FIG. 4, any of three modes, that is, a preset function mode (Z+F mode) of zooming and focusing, a face recognition auto-tracking mode (OBJ mode), and a combination mode (Z+F+OBJ mode) can be selected by changing a setting position of the slide switch 114e. However, the mode setting is not limited thereto but more modes such as modes M1 to M4 may be set so as to enable switching between those modes as will be described later.

Figure 5:
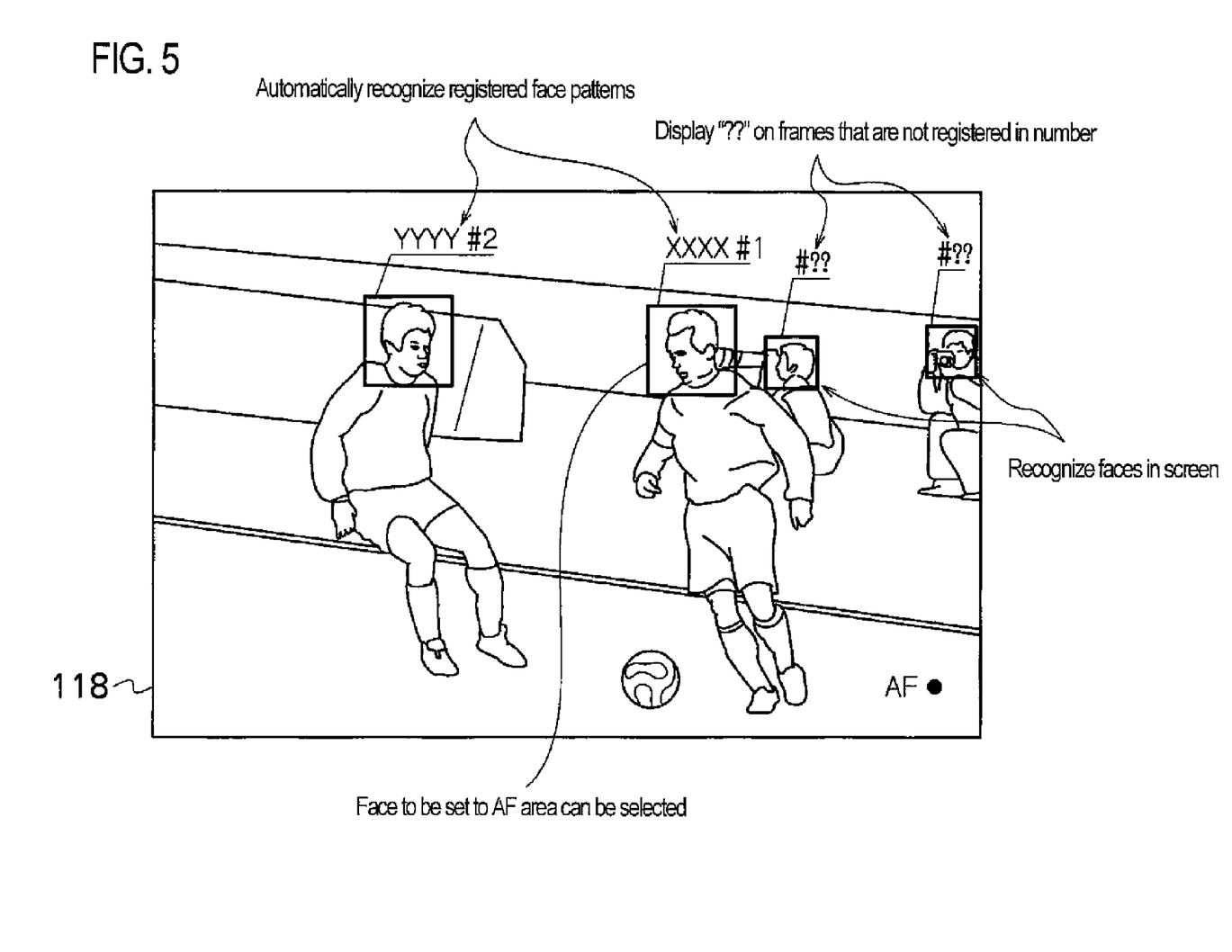
FIG. 5 is an explanatory diagram showing an example of an image displayed on a screen of a viewfinder.

FIG. 5 shows an example of an image displayed on the screen of the viewfinder 118. FIG. 5 shows an image in the case where the auto-tracking is performed for a video of a soccer game, and face frames are displayed for the recognized faces in the screen, respectively.

Furthermore, in the case of the auto-tracking, a registered face pattern(s) are automatically recognized in a frame, and a title (name, number, and the like) is registered for the tracking target, and in the case of display ON, the title is displayed in the vicinity of the face frame.

In FIG. 5, registration patterns of two persons exist in the frame, and the titles for the patterns are registered, respectively. Thus, the titles (name, number, and the like) of "XXXX#1" and "YYYY#2" are displayed for the face frames, respectively. Furthermore, since the face images of the persons who seem to be cameramen located behind in the screen have no registered pattern data, titles for those face frames are displayed as "#??", and the operator can see that those persons are not registered.

Further, in some cases, the title display may be disabled (OFF) since it may be difficult to see the screen if the title is displayed as described above.

Furthermore, when a plurality of registration patterns exist in the frame, it might be hard to know which one is being tracked if the face frames are being displayed for all of the plurality of registration patterns. Thus, a color of the face frame of the tracking target (AF target) may be changed and displayed.

As described above, in FIG. 5, there is a plurality (two persons) of registration patterns in a frame, and it is possible to select which one of them is set as a face pattern of a tracking target to be tracked by performing the AF.

There are various methods for selecting the AF area as the tracking target to be tracked by performing the AF. For example, the operator may select by pressing the switches 114b of the operation unit 114. Alternatively, when priorities are given to the registration patterns in advance and when a plurality of registration patterns exist in the screen, the registration pattern having the highest priority may be automatically selected. Further alternatively, the selection may be automatically performed in a registration order (order of registration No.) of patterns that are registered in association with the switches 114b. The registration order and the priorities are similar to each other, but do not always coincide with each other. The priorities can be set so as to be different from the registration order after the registration, and it is also possible to change the priorities.

The tracking target (AF area) to be tracked by performing the AF is determined, the auto-tracking is started in the screen, and simultaneously the AF is automatically started for the tracking target. When the auto-tracking is being performed, sometimes the tracking target disappears from a frame. However, various cases can be expected as the situation thereafter.

For example, a different registration pattern may not exist in the screen when the tracking target disappears from a frame. Also, in another case, a different registration target may still exist in the screen even when the tracking target disappears from a frame.

In addition, when a different registration pattern does not exist in the screen at that time, the registration pattern being tracked hitherto may appear in a frame again. Also, in another case, a different registration pattern that is not the tracking target may appear in a frame. In further another case, if a different registration target exists in the screen when the tracking target disappears from a frame, the tracking target being tracked hitherto may appear in a frame again.

In these cases, various tracking control methods (tracking modes) of how to select the tracking target and how to perform the auto-tracking can be considered. Hereinafter, the respective methods will be described while classifying these cases.

Figure 6:
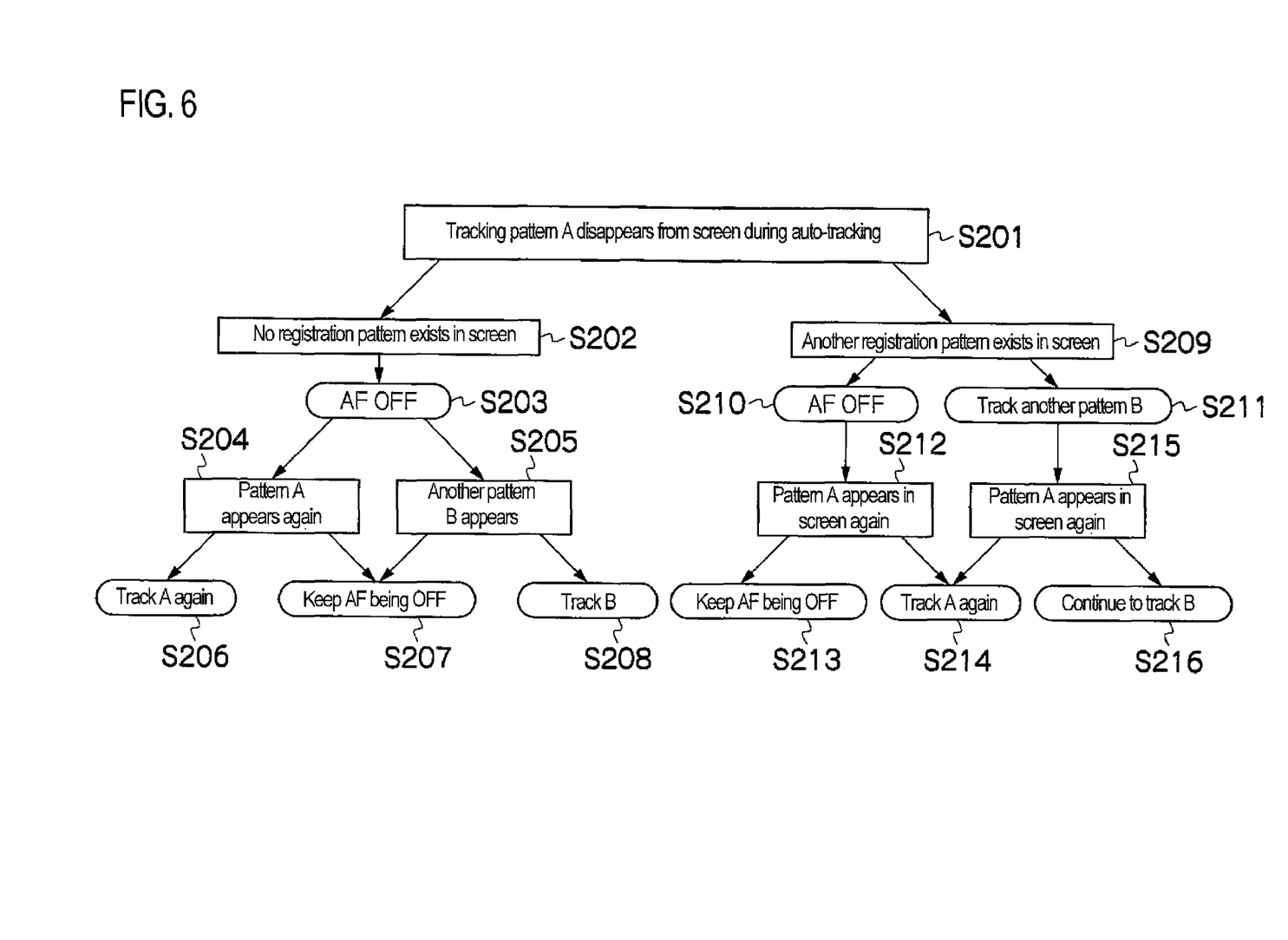
FIG. 6 is a flowchart showing a tracking control after a target being tracked disappears from a screen.

In a flowchart of FIG. 6, if a registration pattern A currently being tracked disappears from the screen when the registration pattern A is automatically being tracked as a tracking target, various situations thereafter are classified with mainly paying attention to a registration pattern that appears on the screen.

As shown in step S201 of FIG. 6, the registration pattern (tracking pattern) A currently being tracked disappears from the screen.

In this case, there may be two situations, that is, one is that any registration pattern does not exist in the screen, and the other is that a registration pattern other than the pattern A exists.

First, let consider the situation where another registration pattern does not exist in the screen after the pattern A disappears from the screen as shown in step S202. In this case, the AF (autofocus) is turned OFF as shown in step S203 since there is already no pattern to be tracked in the screen. Then, the AF is kept being in the OFF state as it is unless a registration pattern exists in the screen.

It is assumed that, subsequently, a registration pattern appears in the screen. In this case, there may be two situations, that is, one is that the pattern A, which was tracked previously, appears in the screen as shown in step S204, and the other is that a registration pattern B other than registration pattern A appears in the screen as shown in step S205.

In step S204, as for a response to the case where the pattern A appears in the screen again, there may be two situations: one is that it is started to track the pattern A again as shown in step S206 since the pattern A being tracked hitherto appears again on the screen, and the other is that the AF may kept being in the OFF state without the pattern A, which disappeared from the screen once, being tracked as shown in step S207.

Furthermore, when the pattern A initially being tracked disappears from the screen, and when any registration pattern to be tracked does not exist in the screen as shown in step S205, another registration pattern B appears in the screen. In this case, there may be two situations: one is that the AF is kept being in the OFF sate as shown in step S207 because the pattern A is hitherto tracked and because the other registration pattern B has no relation, and the other is that the registration pattern B is tracked as shown in step S208 because the pattern A disappears and the registration pattern B enters instead.

Here, the pattern A is tracked again in step S206 only when the pattern A has priority as the tracking target. Thus, even if another registration pattern appears in the screen, such another pattern is not set to a tracking target. Furthermore, the tracking of another registration pattern B in step S208 represents that no matter which registration pattern appears after the pattern A disappears from the screen, the appearing pattern is set to a tracking target.

Furthermore, in step S205, after any registration pattern does not exist in the screen since the pattern A initially being tracked disappears from the screen, then only one person of the registration pattern B appears in the screen. However, a plurality of registration patterns other than the pattern A may simultaneously appear in the screen, and so the plurality of registration patterns may exist in the screen. In this case, any one pattern is selected as a tracking target from among the plurality of registration patterns in step S208. The selection method will be described later.

Next, let consider the situation where a registration pattern other than the pattern A exists in the screen after the pattern A disappears from the screen, as shown in step S209.

As for a response to this case, there may be two situations: one is that the AF is be turned OFF as shown in step S210 because the tracking pattern A does not exist, and the other is that another registration pattern B existing in the screen is tracked as shown in step S211.

If no registration pattern exists in the screen except the other registration pattern B when it is started to track the other registration pattern B in step S211, the pattern B is tracked. However, if a plurality of the registration patterns exist in the screen, one tracking pattern should be determined in some way. The method for selecting one registration pattern from among the plurality of registration patterns as a tracking target (tracking pattern) will be described later.

If the pattern A appears in the screen again as shown in step S212 when the AF has been turned OFF in step S210, the current situation is the same as the above-mentioned situation in step S204.

In this case, there may be two situations: one is that the AF is kept being in the OFF state as shown in step S213 even if the pattern A appears in the screen again, and the other is that it is started to track the pattern A again as shown in step 214.

Furthermore, if the pattern A appears in the screen as shown in step S215 when the other registration pattern B has been set to be tracked in step S211, there may be two situations: one is that it is started to track the pattern A again by changing the tracking target from the pattern B currently being tracked to the pattern A originally being tracked as shown in step S214, and the other is that the tracking of the pattern B is continued as shown in step S216.

As a result, the auto-tracking control methods shown in FIG. 6 can be summarized as follows:

In the flow of the steps S201->S202->S203->S204->S206 and the flow of the steps S201->S209->S210->S212->S214, the pattern A is treated as a main tracking target, and the tracking of the pattern A is prioritized at any time in the following manner. That is, if the pattern A disappears from the screen, the AF is turned OFF irrespective of whether or not another registration pattern exists in the screen. Also, if the pattern A appears in the screen again, it is started again to track the pattern A.

Furthermore, in the flow of steps S201->S202->S203->S205->S208, if another registration pattern B appears in the screen after the pattern A disappears from the screen, the pattern B is tracked.

Further, in the flow of the steps S201->S202->S203->S204 (S205)->S207 and the flow of step S201->S209->S210->S212->S213, once the pattern A, which is tracked, disappears from the screen, the AF is kept being in the OFF state even if the pattern A or another registration pattern appears in the screen.

In the above flows of the tracking control, the tracking of the pattern A is prioritized.

In contrast, in the flow of the steps S201->S209->S211, if the pattern A, which is tracked, disappears from the screen and if another registration pattern exists in the screen, first, another registration pattern is tentatively tracked. In this case, there are the following two situations. One is that the tracking of the other registration pattern is just temporal as shown in the flow of the steps S215->S214, and the tracking target is changed to the pattern A when the pattern A appears in the screen again. The other is that the tracking target is completely changed to the other registration pattern as shown in the flow of the steps S215->S216, and the tracking of the other registration pattern is continued even if the pattern A appears in the screen again.

Figure 7:
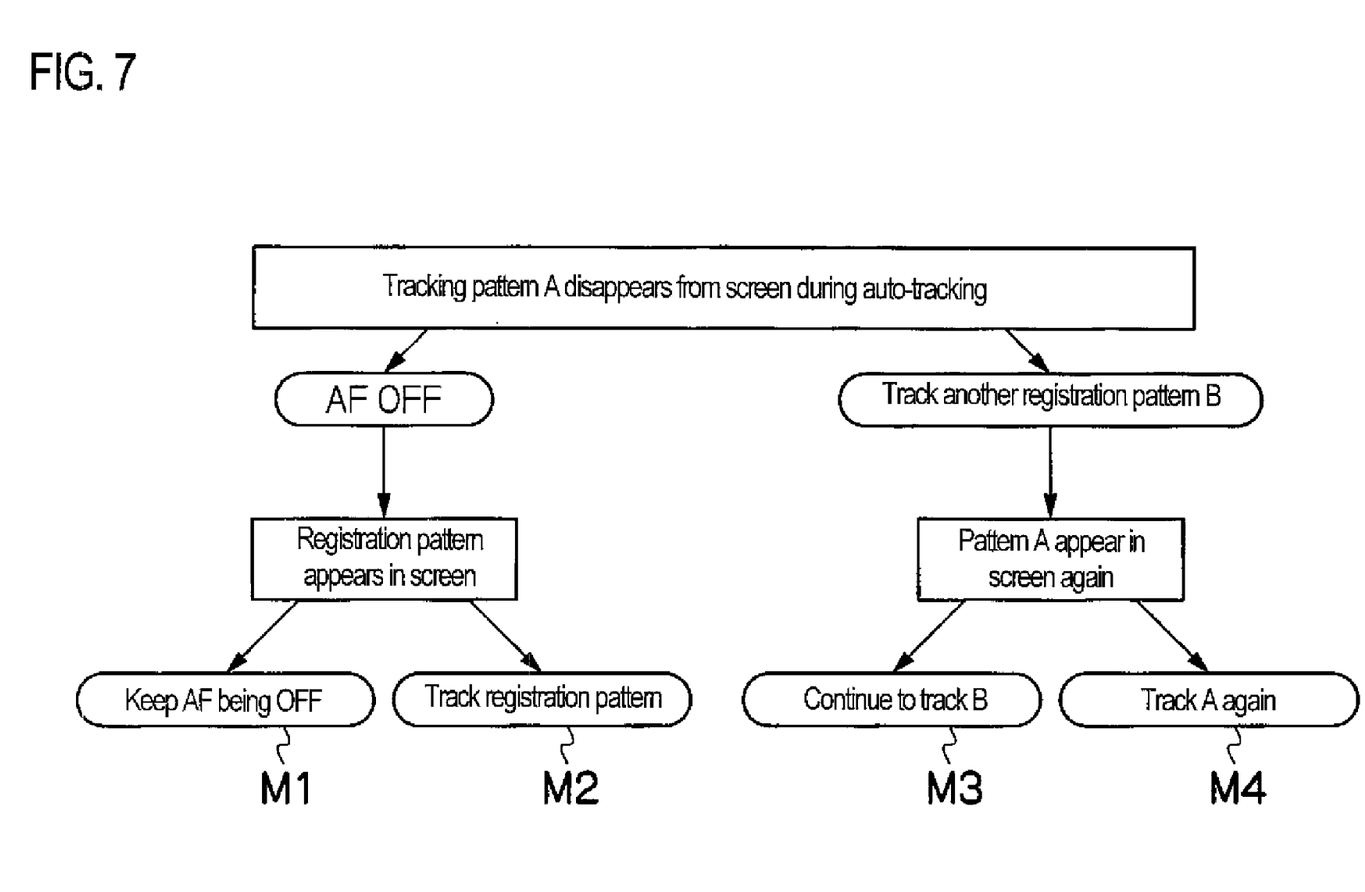
FIG. 7 is an explanatory diagram showing a tracking control by summarizing the tracking control shown in FIG. 6.

Accordingly, the tracking control shown in FIG. 6 can be briefly expressed as that shown in FIG. 7.

Specifically, if a tracking pattern A disappears from a screen when the registration pattern A is tracked as a tracking target, either "AF is tuned OFF" or "another registration pattern B is tracked". If a registration pattern appears in the screen when "AF is turned OFF", the current state ("AF is turned OFF") is maintained, or it is started to track the registration pattern appearing in the screen. If the registration pattern A appears in the screen when "another registration pattern B is tracked", the current state ("another registration pattern B is tracked") is maintained, or it is started again to track the pattern A appearing in the screen again.

As described above, the following modes are considered: a mode M1 in which the AF is kept being in the OFF state even if any registration pattern appears in the screen after the pattern A disappears from the screen; a mode M2 in which if any registration pattern appears in the screen after the pattern A disappears from the screen (especially, the pattern A, which was tracked previously, is prioritized over the other registration patterns), it is started to track the appearing registration pattern; a mode M3 in which if the pattern A disappears from the screen, a tracking target is changed in any case to track another registration pattern B; and a mode M4 in which once the pattern A appears in the screen again, it is restarted to track the pattern A even if another registration pattern B is being tracked.

These are the basic tracking control methods in this embodiment. Furthermore, there may be actually various complicate cases, but the tracking control is performed based on the above-mentioned basic cases.

In practice, the system may include all the above modes, and may include only some of those modes. In addition, when a plurality of modes are provided, the modes are switchable. Thus, it is preferable that the operator perform various tracking process by changing between the modes, for example, in accordance with scenes.

For example, the system may include two modes of: the mode M1 in which the AF is kept being in the OFF state even if a registration pattern appears in the screen after the tracking pattern A disappears from the screen; and the mode M2 in which if a registration pattern appears in the screen, the appearing registration pattern is tracked. The system may be configured to change between these modes.

Alternatively, the system may be configured to change between two modes of: the mode M3 in which even if the pattern A appears in the screen again when another registration pattern B is being tracked, it is continued to track the other registration pattern B; and the mode M4 in which if the pattern A appears in the screen again, the pattern A is tracked again.

Further alternatively, a combination of the modes M1 and M2 may be changed to a combination of the modes M3 and M4.

Next, when a plurality of registration patterns exist in a screen as shown in the step S209 of FIG. 6, a selection method (how to select a registration pattern as a tracking target from among the plurality of registration patterns) will be described.

In the selection method of selecting a registration pattern as a tracking target when a plurality of registration patterns exist in the screen, there may be three situations: first one is that the operator may perform the selection, second one is that the system may automatically perform the selection in order of registering the registration patterns, and third one is that similarly, the system may automatically perform the selection in priority order that is set in advance for the registration patterns.

First, in the pattern registration, for example during shooting, subjects in the screen are registered by assigning the subjects to the switches 14b of the operation unit 14 in FIG. 1 or the switches 114b in FIG. 4 and automatically numbering the subjects. In this manner, it is possible to register patterns as many as the number of switches. Also, when the operator is to select a registration pattern, if the operator presses, for example, the second switch of the switches 14b (or 114b), the registration pattern assigned to the second switch is selected.

Furthermore, in the pattern registration, the operator may manually register a title(s) as described above and additionally may give priorities in registration.

Furthermore, the registration order is formed in an arrangement order of the switches 14b (or 114b). The registration order does not necessarily coincide with the priorities. For example, when the above-mentioned system registers patterns by automatically numbering the patterns and assigning the patterns to the switches, the operator can give to the registration patterns priorities that are different from the order of the switches.

For example, in the tracking control in FIG. 6 as described above, when the tracking pattern A disappears from the screen, the selection of the tracking target of the pattern A is canceled, the AF is turned OFF, and another registration pattern will not be selected as a tracking target in step S210. Accordingly, even if the pattern A appears in the screen again, the AF is kept being in the OFF state. Thereby, the mode M1 shown in FIG. 7 is realized.

Likewise, if the tracking pattern A disappears from the screen in step S201 of FIG. 6 and the AF is turned OFF once, a registration pattern is tracked in any case, and especially, a priority is given to the pattern A so that the pattern A is selected as a tracking target. Then, a registration pattern is searched for in the screen all the time. Therefore, if a registration pattern appears in the screen, that registration pattern is detected, and it is started to track the detected registration pattern. In this case, especially the tracking of the pattern A is prioritized. In this manner, the mode M2 shown in FIG. 7 is realized.

Furthermore, for example, if a registration pattern having the highest priority is set to be tracked at all time and if a pattern currently being tracked disappears from the screen, the priority of the disappearing pattern is changed to the lowest priority. Then, when a pattern B having the next highest priority is being tracked in step S211 of FIG. 6 after the pattern A being tracked hitherto disappears from the screen, even if the pattern A appears in the screen again in step S215, it is still continued to track the pattern B in step S216 without the pattern A being tracked. This is because the priority of the pattern A has already been lowered. Thereby, the mode M3 shown in FIG. 7 is realized.

Further, for example, when the pattern A initially being tracked appears in the screen during the tracking of the pattern B in step S215 of FIG. 6, settings are made so that the pattern A is prioritized over the other registration patterns and that if a plurality of registration patterns exist in the screen, a registration pattern having higher priority is tracked on a priority basis. Accordingly, the tracking of the pattern A instead of the pattern B is started in step S214. Thereby, the mode M4 shown in FIG. 7 is realized.

As described above, by setting priorities for the selection of the tracking target, it is possible to automatically change the tracking target. The mode change is performed by the slide switch 114e of the operation unit 114. Furthermore, the modes may be set or changed in a way that the operator manually selects the tracking target through the operation unit 14 (114).

As described above, the autofocus system according to the embodiments of the invention has described in detail. However, the invention is not limited to the embodiments mentioned above, and it is apparent that various modifications and variations may be made thereto without departing from the technical scope of the invention.

What is claimed is:

1. An autofocus system comprising:
an imaging unit that takes a subject image formed by an optical system;
an autofocus unit that performs autofocus adjustment that adjusts focus of the optical system so as to bring into focus a subject in an AF area in a shot image taken by the imaging unit;
a tracking unit that moves the AF area in accordance with movement of a tracking target subject in the image taken by the imaging unit;
a pattern registration unit that registers a registration pattern of at least one subject among subjects in the image taken by the imaging unit;
a tracking target detection unit that detects the at least one registration pattern, which is registered in the pattern registration unit, from among subjects in the image taken by the imaging unit; and
a tracking target selection unit that selects a registration pattern to be tracked, from among the at least one registration pattern registered in the pattern registration unit, wherein
when the tracking target detection unit detects that the tracking target subject disappears from the image in the course of tracking the tracking target subject having the registration pattern selected by the tracking target selection unit, the autofocus adjustment of the autofocus unit is disabled, and thereafter a disable state of the autofocus adjustment is maintained even if the tracking target detection unit detects that a subject having any of the at least one registration pattern registered in the pattern registration unit appears in the image.

2. An autofocus system comprising:
an imaging unit that takes a subject image formed by an optical system;
an autofocus unit that performs autofocus adjustment that adjusts focus of the optical system so as to bring into focus a subject in an AF area in a shot image taken by the imaging unit;
a tracking unit that moves the AF area in accordance with movement of a tracking target subject in the image taken by the imaging unit;
a pattern registration unit that registers a registration pattern of at least one subject among subjects in the image taken by the imaging unit;
a tracking target detection unit that detects the at least one registration pattern, which is registered in the pattern registration unit, from among subjects in the image taken by the imaging unit; and
a tracking target selection unit that selects a registration pattern from among the at least one registration pattern registered in the pattern registration unit, wherein
when the tracking target detection unit detects that the tracking target subject disappears from the image in the course of tracking the tracking target subject having the registration pattern selected by the tracking target selection unit, the autofocus adjustment of the autofocus unit is disabled, and thereafter when the tracking target detection unit detects that a subject having any of the at least one registration pattern registered in the pattern registration unit appears in the image, the tracking unit starts to track the subject having the detected registration pattern.

3. The autofocus system according to claim 2, wherein when the tracking unit starts to track the subject having the detected registration pattern, a priority is given to the subject having the selected registration pattern as the tracking target subject.

4. An autofocus system comprising:
an imaging unit that takes a subject image formed by an optical system;
an autofocus unit that performs autofocus adjustment that adjusts focus of the optical system so as to bring into focus a subject in an AF area in a shot image taken by the imaging unit;
a tracking unit that moves the AF area in accordance with movement of a tracking target subject in the image taken by the imaging unit;
a pattern registration unit that registers a registration pattern of at least one subject among subjects in the image taken by the imaging unit;
a tracking target detection unit that detects the at least one registration pattern, which is registered in the pattern registration unit, from among subjects in the image taken by the imaging unit;
a tracking target selection unit that selects a registration pattern from among the at least one registration pattern registered in the pattern registration unit; and
a tracking mode switch unit that switches between two tracking modes, wherein
the two tracking modes include
a first tracking mode in which, when the tracking target detection unit detects that the tracking target subject disappears from the image in the course of tracking the tracking target subject having the registration pattern selected by the tracking target selection unit, the autofocus adjustment of the autofocus unit is disabled, and thereafter a disable state of the autofocus adjustment is maintained even if the tracking target detection unit detects that a subject having any of the at least one registration pattern registered in the pattern registration unit appears in the image, and
a second tracking mode in which, when the tracking target detection unit detects that the tracking target subject disappears from the image in the course of tracking the tracking target subject having the registration pattern selected by the tracking target selection unit, the autofocus adjustment of the autofocus unit is disabled, and thereafter when the tracking target detection unit detects that a subject having any of the at least one registration pattern registered in the pattern registration unit appears in the image, the tracking unit starts to track the subject having the detected registration pattern.

5. An autofocus system comprising:
an imaging unit that takes a subject image formed by an optical system;
an autofocus unit that performs autofocus adjustment that adjusts focus of the optical system so as to bring into focus a subject in an AF area in a shot image taken by the imaging unit;
a tracking unit that moves the AF area in accordance with movement of a tracking target subject in the image taken by the imaging unit;
a pattern registration unit that registers a registration pattern of at least one subject among subjects in the image taken by the imaging unit;
a tracking target detection unit that detects the at least one registration pattern, which is registered in the pattern registration unit, from among subjects in the image taken by the imaging unit;
a tracking target selection unit that selects a registration pattern from among the at least one registration pattern registered in the pattern registration unit; and
a tracking mode switch unit that switches between
a first tracking mode in which, when the tracking target detection unit detects that the tracking target subject disappears from the image in the course of tracking the tracking target subject having the registration pattern selected by the tracking target selection unit, the autofocus adjustment of the autofocus unit is disabled, and
a second tracking mode in which when the tracking target detection unit detects that the tracking target subject disappears from the image in the course of tracking the tracking target subject having the registration pattern selected by the tracking target selection unit, if a subject having another registration pattern, which is registered in the pattern registration unit and other than the selected registration pattern, exists in the image, the tracking unit tracks the subject having said another registration pattern.

6. The autofocus system according to claim 5, wherein in the first tracking mode, when a subject having any of the at least one registration pattern registered in the pattern registration unit appears in the image with the autofocus adjustment disabled, the autofocus adjustment is kept being disabled.

7. The autofocus system according to claim 5, wherein in the first tracking mode, when a subject having any of the at least one registration pattern registered in the pattern registration unit appears in the image with the autofocus adjustment disabled, the tracking unit starts to track the subject having appeared in the image.

8. The autofocus system according to claim 5, wherein
in the first tracking mode, the tracking mode switch unit further switches between
a third tracking mode in which when a subject having any of the at least one registration pattern registered in the pattern registration unit appears in the image with the autofocus adjustment disabled, the autofocus adjustment is kept being disabled, and
a fourth tracking mode in which when a subject having any of the at least one registration pattern registered in the pattern registration unit appears in the image with the autofocus adjustment disabled, the tracking unit starts to track the subject having appeared in the image.

9. The autofocus system according to claim 5, wherein in the second tracking mode, when the tracking target subject appears in the image again in the course of tracking the subject having said another registration pattern, the tracking unit continues to track the subject having said another registration pattern.

10. The autofocus system according to claim 5, wherein in the second tracking mode, when the tracking target subject appears in the image again in the course of tracking the subject having said another registration pattern, the tracking unit stops tracking the subject having said another registration pattern, and starts tracking the tracking target subject again.

11. The autofocus system according to claim 5, wherein in the second tracking mode, the tracking mode switch unit further switches between
- a fifth tracking mode in which, when the tracking target subject appears in the image again in the course of tracking the subject having said another registration pattern, the tracking unit continues to track the subject having said another registration pattern, and
- a sixth tracking mode in which when the tracking target subject appears in the image again in the course of tracking the subject having said another registration pattern, the tracking unit stops tracking the subject having said another registration pattern and starts tracking the tracking target subject again.

* * * * *